(12) United States Patent
Schneider (10) Patent No.: US 10,744,427 B2
(45) Date of Patent: Aug. 18, 2020

(54) PARTICLE TRAP/FILTER AND SYSTEMS RELATED THERETO

(71) Applicant: SMART, INC., Gardena, CA (US)

(72) Inventor: Paul Schneider, Gardena, CA (US)

(73) Assignee: SMART, INC., Gardena, CA (US)

( * ) Notice: Subject to any disclaimer, the term of this patent is extended or adjusted under 35 U.S.C. 154(b) by 287 days.

(21) Appl. No.: 15/829,856

(22) Filed: Dec. 1, 2017

(65) Prior Publication Data

US 2018/0085687 A1    Mar. 29, 2018

Related U.S. Application Data

(63) Continuation-in-part of application No. 14/849,364, filed on Sep. 9, 2015, now Pat. No. 9,861,247.

(51) Int. Cl.
| | |
|---|---|
| *B01D 21/26* | (2006.01) |
| *B01D 21/00* | (2006.01) |
| *B01D 29/03* | (2006.01) |
| *A47L 13/50* | (2006.01) |
| *A47L 13/51* | (2006.01) |
| *A47J 47/18* | (2006.01) |
| *B01D 21/24* | (2006.01) |

(52) U.S. Cl.
CPC .............. *B01D 21/26* (2013.01); *A47J 47/18* (2013.01); *A47L 13/50* (2013.01); *A47L 13/51* (2013.01); *B01D 21/0012* (2013.01); *B01D 21/2483* (2013.01); *B01D 29/03* (2013.01); *B01D 21/267* (2013.01)

(58) Field of Classification Search
None
See application file for complete search history.

(56) References Cited

U.S. PATENT DOCUMENTS

| | | | | |
|---|---|---|---|---|
| 3,541,004 | A * | 11/1970 | Cooper | B01D 65/02 210/636 |
| 4,485,645 | A * | 12/1984 | Mulder | D06F 39/10 134/104.4 |
| 6,000,094 | A * | 12/1999 | Young | A47L 13/58 15/260 |
| 7,025,880 | B2 | 4/2006 | Lamb | |
| 2014/0202941 | A1 * | 7/2014 | Iacovacci | B01D 21/0012 210/167.18 |

* cited by examiner

*Primary Examiner* — Cristi J Tate-Sims
(74) *Attorney, Agent, or Firm* — Hackler Daghighian Martino & Novak (57) ABSTRACT

The present patent document discloses filters and methods of filtering bucket wash water by stacking identical filters in a rotated position. In preferred embodiments, the method comprises: placing a first filter in a bucket; placing an identical second filter on top of the first filter wherein: the second filter is rotated by a radial angle with respect to the first filter and a first pair of tapered passages on the second filter that are longer than typical passages on the second filter are inserted into a second pair of tapered passages on the first filter such that a typical passage on the second filter is held above the first filter and a typical passage on the second filter does not axially align with a typical passage on the first filter.

15 Claims, 12 Drawing Sheets

Fig. 14

PARTICLE TRAP/FILTER AND SYSTEMS RELATED THERETO

CROSS-REFERENCE TO RELATED APPLICATIONS

This application is a continuation-in-part of U.S. patent application Ser. No. 14/849,364 filed on Sep. 9, 2015, which is hereby incorporated by reference in its entirety.

FIELD

The present patent document relates to particle traps and filters and systems related thereto. More particularly, the present patent document relates to particle traps and filters for use in containers of fluid used for washing objects.

BACKGROUND

It has been appreciated by those skilled in the art that particles of dirt or other contaminates may cause scratches during the cleaning process. For example, if one were to clean a car with a sponge or pad, the dirt trapped between the sponge and the surface of the car may cause scratches in the paint when the sponge is moved over the surface. Accordingly, it is beneficial to try and remove as much of the dirt or other contaminants from the sponge as possible as frequently as possible. By keeping the sponge or pad clean, there is less risk of scratching the surface of the car or other object being cleaned.

Traditionally, someone cleaning a car repeatedly dunks the sponge or pad in a bucket of soapy water to remove the dirt and other particles from the sponge or pad. While this method of cleaning does help remove some of the contaminants from the cleaning object, it is not efficient in doing so. To this end, dirt or other particles may remain on the sponge or cleaning pad and cause scratches on the surface of the object being cleaned or at a minimum, prevent the maximum cleanliness from being achieved.

To this end, people have tried to come up with ways to better remove the dirt and other contaminants from the cleaning apparatus during the process of cleaning an object. Traditional strainers are not effective and filtering systems rely on pads, sponges or filters that require replacing and simply do not function well.

One proposed method is provided in U.S. Pat. No. 7,025,880, titled Fluid Receptacle and Filter System (hereinafter "'880 Patent") The '880 Patent provides a system for separating particles from fluid which includes a receptacle for containing fluid and a filter assembly which includes a filter component shaped to fit the receptacle, an O-ring encircling the perimeter of the filter component for securing the filter assembly in the receptacle, and at least two baffles attached to the bottom of the filter component for reducing the motion of the fluid around and through the filter assembly. While the system disclosed in the '880 Patent may be more effective than traditional filters, it still does not provide the maximum effectiveness at filtering and removing dirt and contaminates from a sponge, pad or other washing device during the washing process. To this end, a more effective and efficient particle trap/filter is desirable. It would be particularly beneficial if the particle trap/filter could be used in the process of washing cars and other objects. It would also be beneficial if the particle trap/filter could be used with the traditional method of using a bucket of soapy water or other cleaning liquid.

SUMMARY OF THE EMBODIMENTS

In view of the foregoing, an object according to one aspect of the present patent document is to provide filters and systems for use with the filters for separating dirt and other contaminants from wash liquids. Preferably the methods and apparatuses address, or at least ameliorate one or more of the problems described above. To this end, a filter is provided. In one embodiment the filter comprises: a main body with a planar top surface and planer bottom surface; and, a plurality of passages that pass through the body wherein the passages have a larger diameter section that extends above the top surface and a smaller diameter section that extends below the bottom surface.

In preferred embodiments, at least a portion of the passages is funnel shaped. In yet other embodiments, the entire passage may be funnel shaped. In still yet other embodiments, the top of each passage is a straight round section that transitions into the funnel shape.

In some embodiments, the passages are arranged in concentric circles radiating out from a center of the filter. Although circular patterns of the passages is preferred, other concentric shapes may be used. For example, the passages may be patterned in concentric hexagons, octagons, decagons, or other geometric shape with multiple sides. The more sides used the closer to a circle and the more preferred.

The body of the filter includes a plurality of supports to form a gap under the bottom of the passages when the filter is installed in a container such as the bottom of a bucket. In preferred embodiments, the filter is supported by a plurality of legs that extend from the body down below the bottom of the passages. In other embodiments, other support structures may be used. If legs are used, the legs may also be funnel shaped. In some embodiments, at least a subset of the plurality of legs further include holes in their sidewalls below the body.

In some embodiments, the filter further comprises a plurality of holes through the body and located in between the passages. In some embodiments, those holes may also be funnel shaped.

Although many different manufacturing techniques may be used, the filters are preferably made from injection molded plastic. However, molding or other manufacturing techniques may be used.

In some embodiments of the filter, the filter comprises: a plurality of passages all oriented parallel to each other wherein the passages have a circular top with a first diameter and a circular bottom with a second smaller diameter and a portion in between the top and the bottom that is funnel shaped; a body that couples each of the plurality of passages together; wherein the passages are arranged in concentric circles radiating out from the center of the body. In some of these embodiments, the top extends above a top of the body and the bottom extends below a bottom of the body.

In another aspect of the embodiments described herein, a system for separating dirt from a cleaning liquid is provided. In some embodiments of the system, the system comprises: a filter as described herein; and, a bucket with an inner diameter designed to receive the outer diameter of the filter. In preferred embodiments of the system, the system further comprises a seal designed to seal the filter to the bucket.

In another aspect of the present patent document a filter is disclosed. The filter comprises: a main body with a planar top surface and planer bottom surface; a plurality of tapered passages each with a bottom that comprise a plurality of passage bottoms wherein each passage passes through the body and wherein the plurality of passage bottoms extends below the planer bottom surface of the main body by a length; a first pair of tapered passages that are wider than the plurality of tapered passages wherein the first pair of tapered passages are positioned the same distance from the center of the filter and wherein the first pair of tapered passages are positioned a radial angle apart; and a second pair of tapered passages that are wider than the plurality of tapered passages wherein the second pair of tapered passages are positioned the same distance from the center of the filter as the first pair of tapered passages and wherein the second pair of tapered passages are positioned the radial angle apart and wherein the second pair of tapered passages extend below the bottom of the first pair of tapered passages by at least the length.

In preferred embodiments, the filter has legs and the legs are all a same distance away from the center of the filter and spaced apart by the radial angle. In some embodiments, the radial angle is ninety degrees.

In some embodiments, the first pair of tapered passages extends below the planar bottom surface of the main body by the length. In some embodiments, the second pair of passages extend below the bottom of the first pair of passages by 1.25 times the length.

In another aspect of the present invention, a method of filtering bucket wash water is provided. In preferred embodiments, the method comprises: placing a first filter in a bucket; placing a second filter, which is identical to the first filter, in the bucket on top of the first filter wherein: the second filter is axially aligned with the first filter but rotated by a radial angle and a first pair of tapered passages on the second filter that are longer than a typical passage on the second filter are inserted into a second pair of tapered passages on the first filter such that an outside bottom of the first pair of tapered passages comes in contact with an inside bottom of the second pair of tapered passages such that a typical passage on the second filter is held above the first filter and a typical passage on the second filter does not axially align with a typical passage on the first filter.

In preferred embodiments, a typical passage on the first filter and a typical passage on the second filter are cone shaped. In some embodiments, the first pair of passages and the second pair of passages are wider than a typical passage.

In some embodiments, the first filter further includes a plurality of legs that are the same length as the second pair of passages. In embodiments where the radial angle is 90 degrees, the legs may be positioned around the perimeter of the first filter and second filter spaced by the radial angle.

Further aspects, objects, desirable features, and advantages of the apparatus and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

DETAILED DESCRIPTION OF THE EMBODIMENTS

Figure 1:
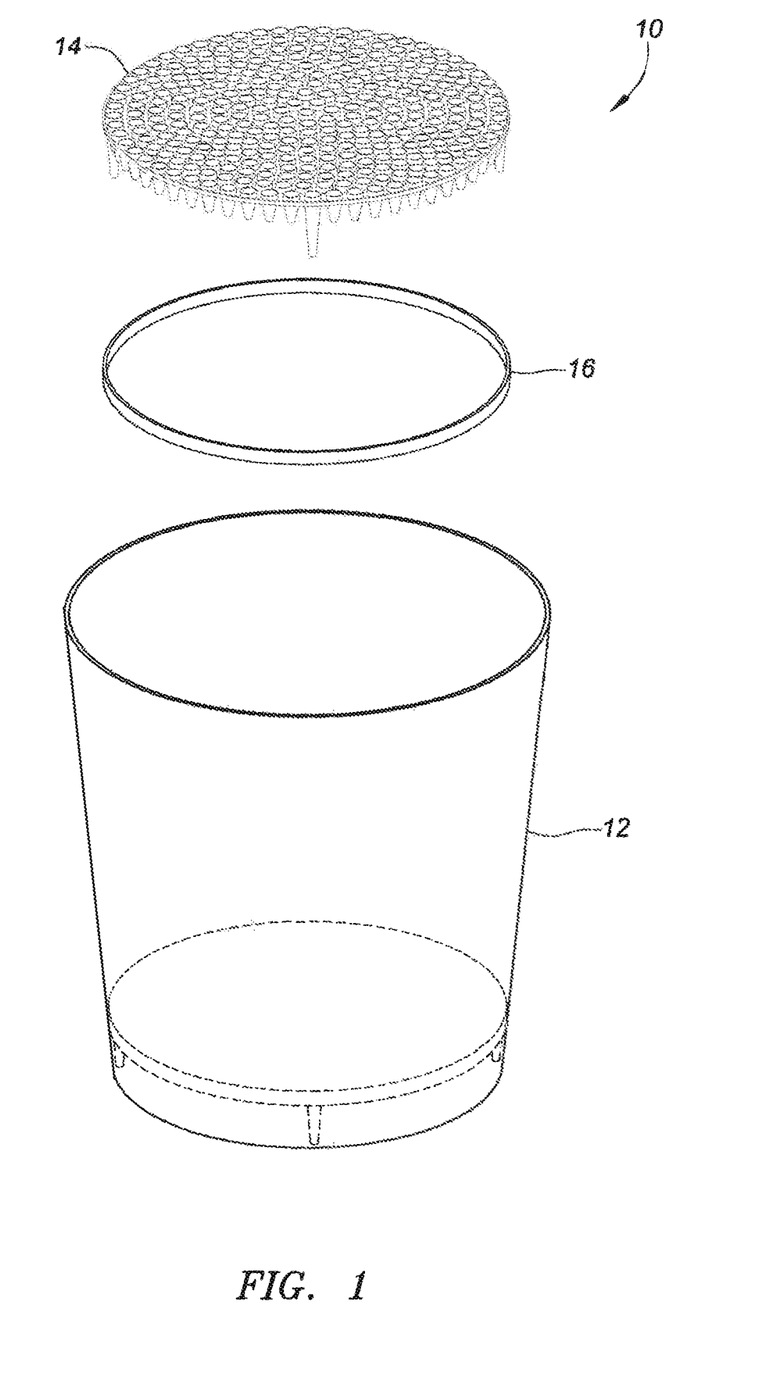
FIG. 1 illustrates an exploded view of one embodiment of a system for providing clean wash water.
Figure 2:
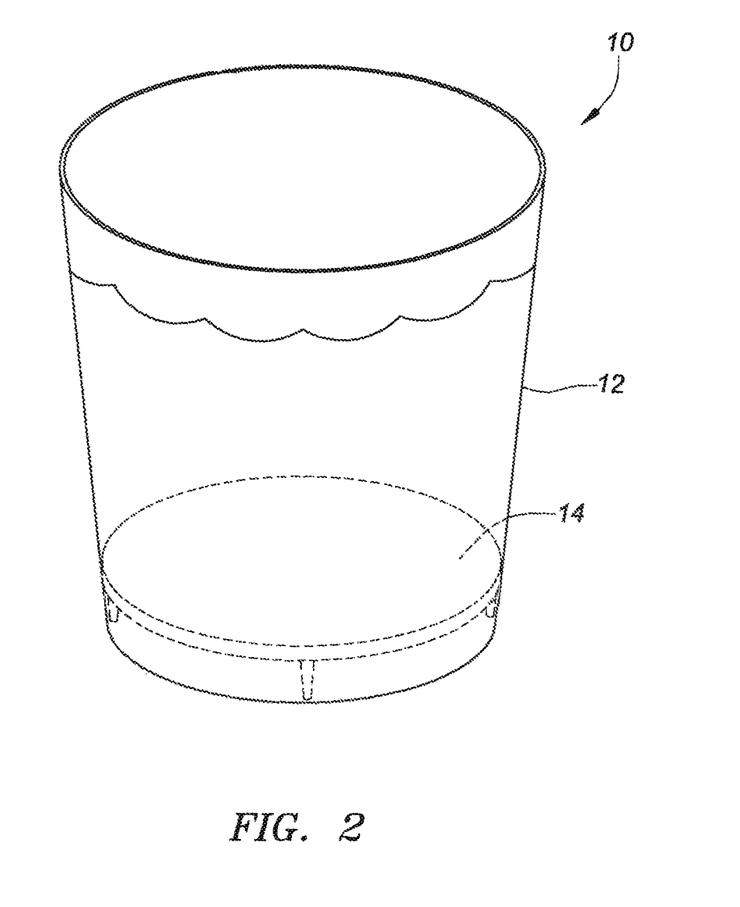
FIG. 2 illustrates an isometric view of a system for separating dirt and other contaminants from a wash liquid with a filter as described herein located on the bottom of a container.

The present patent document discloses systems, apparatus and methods to deliver clean wash water without replacing filters. FIG. 1 illustrates an exploded view of one embodiment of a system for providing clean wash water. The embodiment shown in FIG. 1 comprises a container 12, a filter 14 and a seal 16. FIG. 2 illustrates an assembled version of the embodiment of FIG. 1 with the filter 14 placed in the bottom of the container 12.

Container 12 may be any type of container including a bucket, bin, cup, tub or any other type of container that can hold a fluid. Moreover, container 12 may be made of various different materials including metal, glass or plastic to name a few. In a preferred embodiment, container 12 is a bucket and may further include a handle and/or lid (not shown). In an even more preferred embodiment, container 12 is a standard size bucket such as a 1 gallon, 2 gallon or 5 gallon bucket. Although container 12 may be any shape, it is preferably cylindrical.

In a preferred embodiment, filter 14 is shaped and sized to fig snuggly inside of container 12. As used herein, a snug fit means that the diameter of the filter 14 is slightly smaller than the inner diameter of container 12. For example, filter 14 may have a diameter of approximately 1 millimeter less than the inside diameter of container 12 where the filter sits when assembled. In some embodiments, a seal 16 is placed in the space between the outside of the filter 14 and the inside of the container 16. The seal acts to provide a complete or partial fluid seal between the filter 14 and the container 12. In preferred embodiments, the seal is made from rubber, silicone or another soft deformable material. In some embodiments, seal 16 may be an O-ring. In some embodiments, no seal 16 is used. In some embodiments the diameter of the outside of the filter may be sized such that when it is pushed into a container with a reducing inside diameter, it may be pushed down until an interference fit occurs. To this end, a correctly shaped and sized container 12 and filter 14 may be provided such that the filter 14 is self-positioning at the correct depth within the container.

While in some embodiments a seal 16 may be used, in other embodiments no seal 16 is used. In embodiments without a seal 16, whatever gap exists between the outside of the filter 14 an the inside of the container 12 may serve as an air release.

In some embodiments, the diameter of the outside of the filter 14 may vary in order for the filter 14 to match a changing diameter in the inside of a container 12. For example, the top of the filter 14 may have a slightly larger diameter than the bottom of the filter 14 such that the filter 14 wedges inside a container 12 with a reducing inner diameter.

The filter 14 may be made out of various different kinds of materials but is preferably made from plastic. Filter 14 may be created using molding, injections molding, 3D printing such as Selective Laser Sintering (SLS) or other rapid prototype manufacturing, or other manufacturing methods.

In some embodiments, the filter 14 is designed to be less buoyant than the liquid it will be submerged in and particularly, less buoyant that water. This allows the filter 14 to stay down under the surface of the wash liquid. In some embodiments, this is achieved by the way the passages are positioned and their shape. The shape of the passages may also help keep the filter submerged in the wash water. For example, where the passages have a bigger diameter at a top and the smaller diameter is at the bottom. Finally, a planar body 21, as shown in FIG. 3 also helps the filter 14 stay at the bottom of a container 12 filled with a wash liquid.

As may be seen in FIG. 2, the container may be filled or partially filled with a cleaning fluid. The cleaning fluid may be any type of cleaning fluid including but not limited to water, soapy water, water with a soap additive, chemical solutions, cleaning agents or any other type of cleaner or cleaning fluid.

Figure 3:
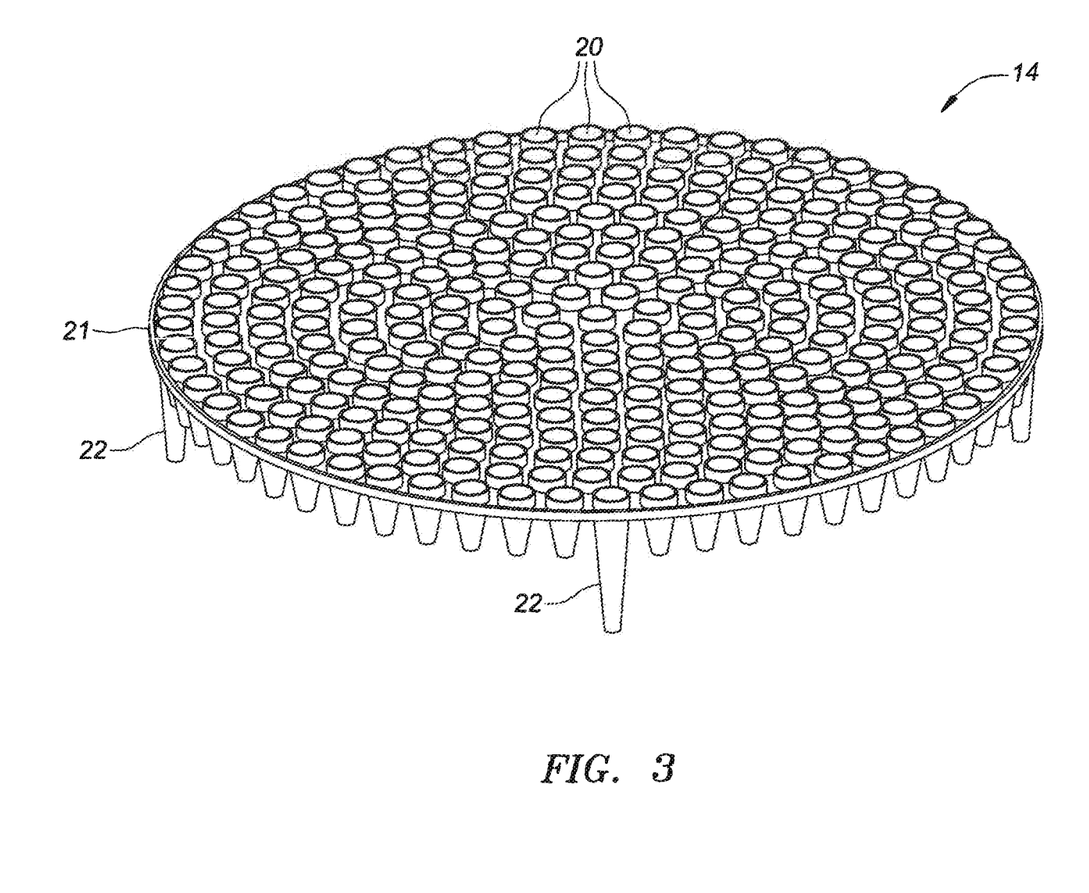
FIG. 3 illustrates an isometric view of one embodiment of a filter according to the teachings of the present patent document.

FIG. 3 illustrates an isometric view of one embodiment of a filter 14 according to the teachings of the present patent document. In the embodiment of the filter 14 shown in FIG. 3, the filter 14 includes a plurality of passages 20 that pass through the filter from the top to the bottom. The passages are all connected together by a body 21. The body 21 connects each of the outer walls of the passages 20 together to form a continuous filter 14. In a preferred embodiment, the body 21 is generally planar located with a thickness such that a top portion of the passage projects above the top surface of the body 21 and a lower portion of the passage projects below the bottom surface of the body 21. To this end, the body 21 is much thinner than the thickness of the filter 14. A thinner body 21 reduces weight and manufacturing costs. As will be discussed below, allowing the passages to extend above and below the body 21 also has additional benefits.

In some embodiments, body 21 can have a slanted angle from the outer to the center of the body, creating a funnel-like feature where any dirt not trap by the passages 20 can fall to the center. This creates one big funnel out of the entire body. In other embodiments, the slope may be in the opposite direction such that any dirt not trap by the passages 20 would fall to the outer diameter of body 21.

In the embodiment shown, the passages 20 are small half inch diameter plastic cone that point down into the container 12 when the filter 14 is inserted. As may be seen in this embodiment, the passages 20 may be a tapering, cone-shaped piece of plastic with small holes in the top that gradually get smaller towards the bottom. As explained in more detail below, the shape and orientation of these passages are important to creating an effective filter.

In the embodiments described herein, the passages 20 on the filter 14 are configured to utilize the natural centrifuge that is created during the wash process. As a user inserts their hand in and out of the water and soap filled container 12, a natural rotation of the liquid inside the container 12 is created. This rotation moves the wash liquid around and into the passages 20 where it can be filtered. The rotations created in the container 12 combined with gravity create the ideal environment for spinning water to filter through the system-delivering the most effective way to separate the grit out of the water or other liquid.

In the embodiments disclosed herein, the passages 20 and filter 14 are configured to promote this centrifuge effect to clean the water and trap dirt at the bottom of the container 12 allowing clean water to flow back to the top above the filter 14.

Figure 4:
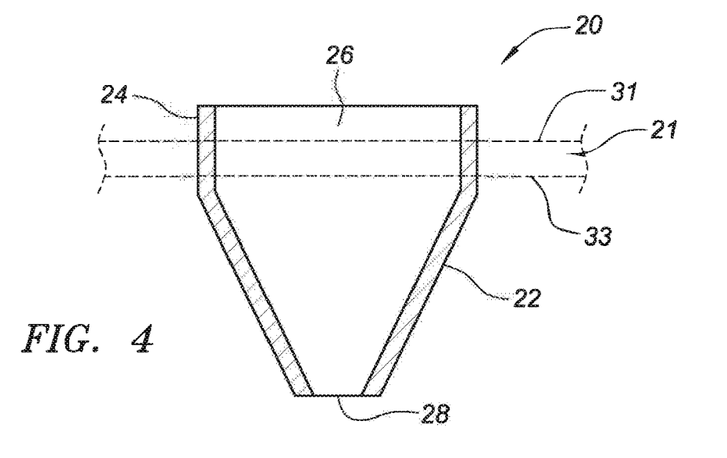
FIG. 4 illustrates a cross sectional view of one design of a passage for use with the filter embodiments described herein.

FIG. 4 illustrates a cross section of one design of a passage 20 for use with the filter 14 embodiments described herein. As may be seen in FIG. 4, the passage 20 is preferably cone shaped and has a funnel portion 22. In preferred embodiments, the passage 20 has a larger diameter hole 26 at the top and a smaller diameter hole 28 at the bottom with a funnel shaped wall 22 connecting the larger diameter hole 26 to the smaller diameter hole 28. The larger diameter hole 26 at the top makes it easy for the particulates in the cleaning fluid to enter the passage 20 from the top while making it difficult for them to enter the passage from the bottom. This helps trap the particulates in the wash fluid under the filter 14. Moreover, the funnel shape 22 helps promote the natural centrifuge effect created in the wash fluid when a user pushes their hand in and out of the container 12.

In preferred embodiments, the passage includes a portion 24 that extends above the body 21 of the filter 14. The portion 24 of the passage that extends above the top surface 31 of the body 21 of the filter 14 may also be referred to as a "lip" 24. The lip 24 provides a better cyclone design as well as making it the ideal surface for cleaning wash pads, mash mitts, sponges, buffing pads or any other type of washing device. By lifting the passages 20 such that they extend above the body of the filter 14 they work better and clean items rubbed against them, therefore making them an ideal wash board. In preferred embodiments, the lip 24 may be a small portion of the passage 20. In some embodiments, 10% of the passage 20 extends above the top surface 31 of the body 21 of the filter 14 while in other embodiments only 5% or 3% extends above the body 21 of the filter 14. A subtle lift assures that no dirt or grime can stay trapped between the passages 20.

As may be seen in the cross section of the passage 20 shown in FIG. 4, in some embodiments, the entire passage is not required to be a funnel 22. As may be seen, the passage 20 may be made up of portions like the lip 24 that are not part of the funnel 22. However, in the preferred embodiments disclosed herein, at least a portion of the passage 20 is funnel shaped 22. In the embodiment shown in FIG. 4, the passage 20 comprises a funnel shaped portion 22 that extends up from the smaller diameter hole 28 with a steadily increasing diameter. In some embodiments, the funnel shaped portion 22 may extend all the way to the top of the larger diameter hole 26. However, in some embodiments, the funnel shaped portion 22 may terminate at an upper portion that is comprised of a vertical wall. The vertical wall may form the lip 24. In yet other embodiments, the passage 20 may also include a vertical wall portion at the bottom of the funnel shaped portion 22. In still yet other embodiments, the passage 20 may be made of combinations of vertical wall portions and funnel portions. In embodiments with cross section of varying designs, the funnel portions may have walls with varying slope or identical slopes or a mix of both.

Figure 5:
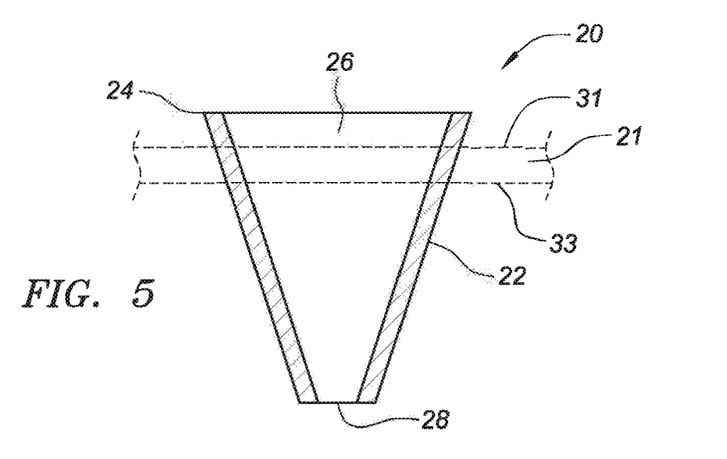
FIG. 5 illustrates a cross-sectional view of another embodiment of a passage for use in a filter.

FIG. 5 illustrates a cross-sectional view of another embodiment of a passage 20 for use in a filter 14. In the embodiment shown in FIG. 5, the entire passage 20 is constructed of a funnel 22. In preferred embodiments, the top of the funnel 22 may be pushed up above the body 21 of the filter 14 as shown.

Figure 6:
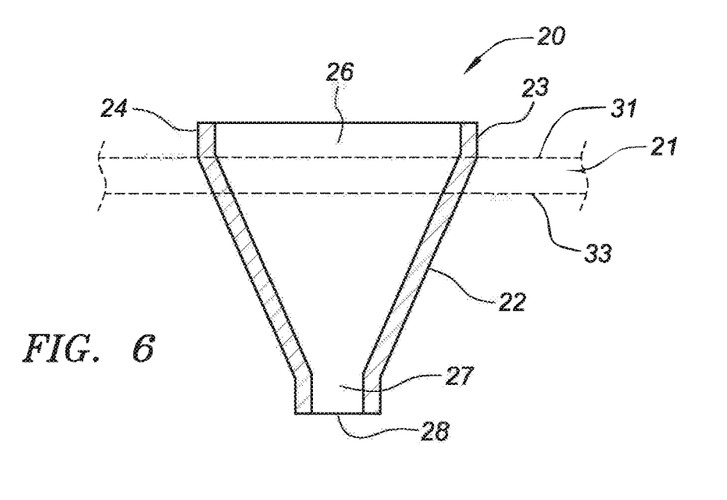
FIG. 6 illustrates a cross-sectional view of another embodiment of a passage for use in a filter.

FIG. 6 illustrates a cross-sectional view of another embodiment of a passage 20 for use in a filter 14. The embodiment shown in FIG. 6 includes a plurality of varying sections. The top of the passage 20 consists of a vertical section 23. The vertical section 23 transitions into a funnel section 22. Finally, the funnel section 22 transitions into another vertical section 27. As may be seen, the top portion 24 of the passage 20 forms a lip 24 my rising above the body 21 of the filter 14.

In operation, the filter 14 is placed in a container full of a washing liquid. The passages 20 within the filter 14 work with the natural centrifugal force created in the wash liquid within the container 12 to trap dirt and other contaminants below the filter 14. The dirt particles floating in the water are drawn through the passages 20, spin around, drops down, and collect in the bottom of the container 12 where they are prevented from coming into contact with the sponge cloth or other washing device being used.

Figure 7:
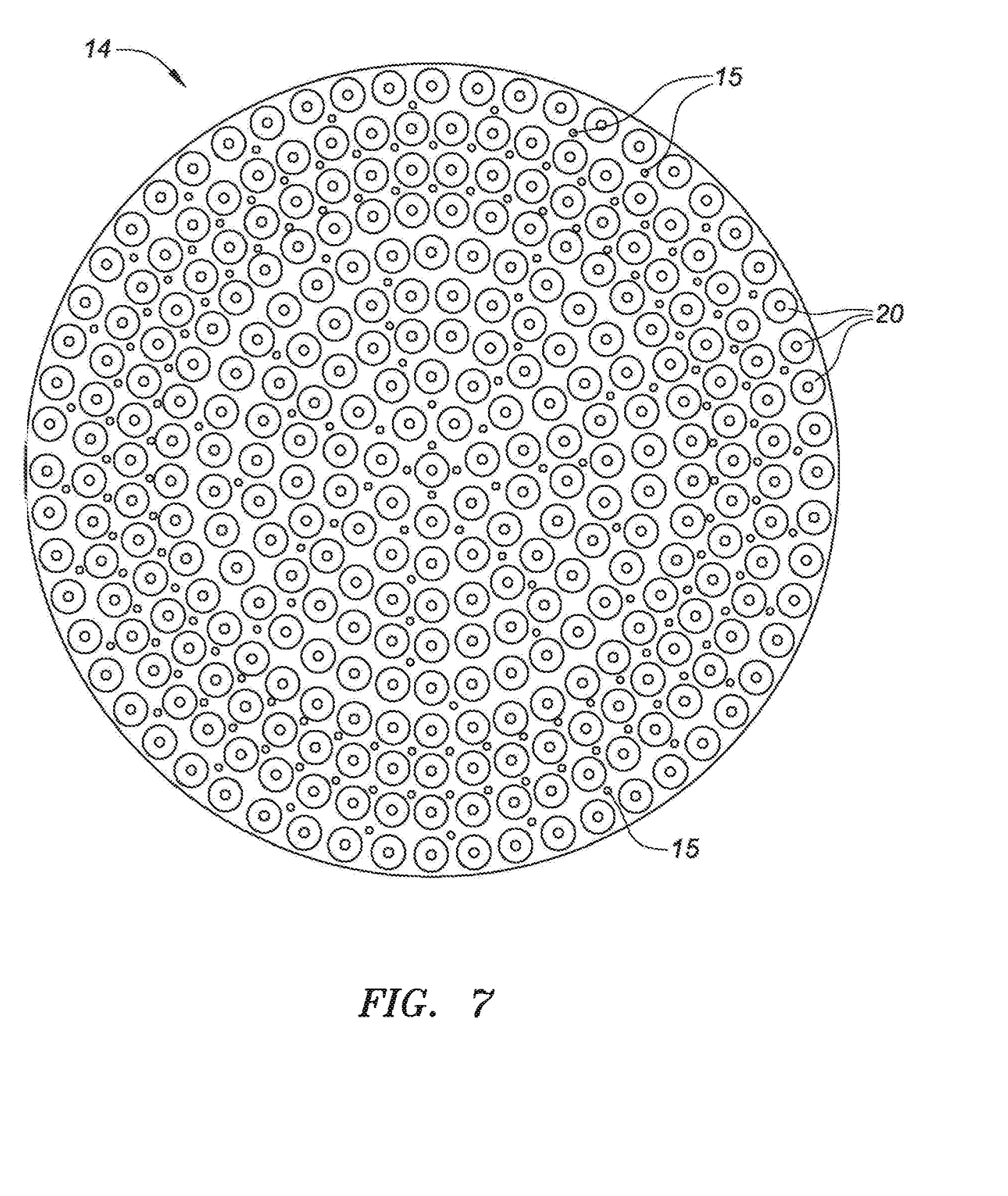
FIG. 7 illustrates a top view of the embodiment of the filter in FIG. 3.

FIG. 7 is a top down view of a filter 14. As may be seen, filter 14 includes a plurality of passages 20. In a preferred embodiment, the passages 20 are spaced such that they cover as much of the top of the body 21 of the filter 14 as possible.

In FIG. 7, filter 14 is illustrated as round but filter 14 may be any shape. Filter 14 is preferably shaped to match the interior shape of container 12. Round is preferable for both because round promotes the spinning of the wash fluid and the centrifugal effects created thereby.

In some embodiments, the passages 20 may be placed randomly within the body 21 of the filter 14. In yet other embodiments, the passages 20 may be patterned. By maximizing the spread of the passages 20 along with systematically and geometrically placing the passages 20 over the surface of the filter 14, a more efficient method of filtering water during a wash may be provided. In a preferred embodiment, the passages are patterned in circles that start in the center and extend to the outer edge of the filter 14. As may be seen in the embodiment in FIG. 7, the passages 20 are patterned in 9 concentric circles across the radius of the filter 14. Depending on the size of the passages 20 and the size of the filter 14, any number of concentric circles may be used such the filter 14 is covered with passages 20. Patterning the passages 20 in concentric circles helps further promote the rotation of the wash liquid and increases the centrifugal forces created thereby. Although concentric circles are preferred, the passages may be oriented or patterned in other ways.

In some embodiments, the space between the passages 20 is preferably minimized. To this end, the concentric circles of passages 20 may be rotated with respect to each other such that the diameters of the passages 20 in one concentric circle falls between the diameters of two passages 20 in a neighboring concentric circle. In this way, the concentric circles can be pushed closer together and the space between the passages 20 minimized.

Figure 8:
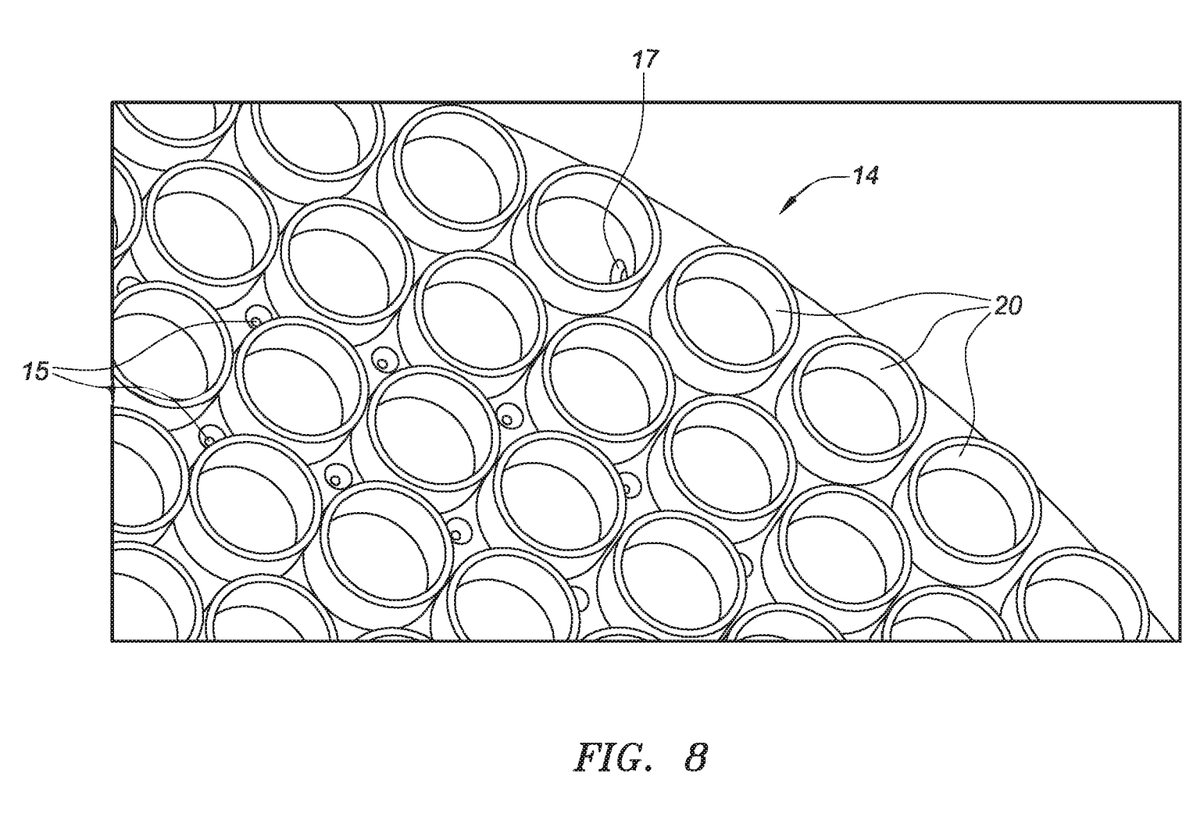
FIG. 8 illustrates a close-up view of an edge portion of the filter of FIG. 3.

FIG. 8 illustrates a close up view of a portion of one embodiment of a filter 14. As may be seen in FIG. 8, in some embodiments, the filter 14 may include holes 15 in the spaces between the passages 20. The holes 15 may help trapped air be released when the filter 14 is first pushed into the wash liquid. The holes may further act as filters for particles that fall between passages 20. Any number of holes 15 may be used and a single filter 14 may have only a few holes 15 or may have a hole 15 in every space between the passages 20

The holes 15 may be any shape or size. In most embodiments, the holes 15 will be significantly smaller than the passages 20. In some embodiments, the holes 15 may also have a funnel shape. In other embodiments, the holes may simply pass straight through. In yet other embodiments, no holes 15 exist in the spaces between the passages 20.

Instead of, or in addition to, holes 15, filter 14 may have holes 17 in the side walls of some of the passages. It is important that hole 17 in the side wall of passage 20 is located under the plane of the filter 14 such that dirt falling through the hole is trapped under filter 14. Any number of holes 17 may be used. Preferably, only a select number of passages 20 include holes 17. In preferred embodiments, 10-20% of the passages include holes 17. In yet other embodiments, less than 10% of the passages 20 include holes 17 and in some embodiments, holes 17 in the side walls of the passages 20 may not be used at all. If holes 17 are used, they may be made large enough to allow the tip of a human finger fit into the hole such that it may be used to better grasp the filter 14.

In yet other embodiments, one or more larger passages 20 may be created within the plane of the body that can accommodate a human finger. These passages 20 may be bunched such that a human hand can easily pick up the filter. In a preferred embodiment, four large passages 20 may be located in the center of body.

Figure 9:
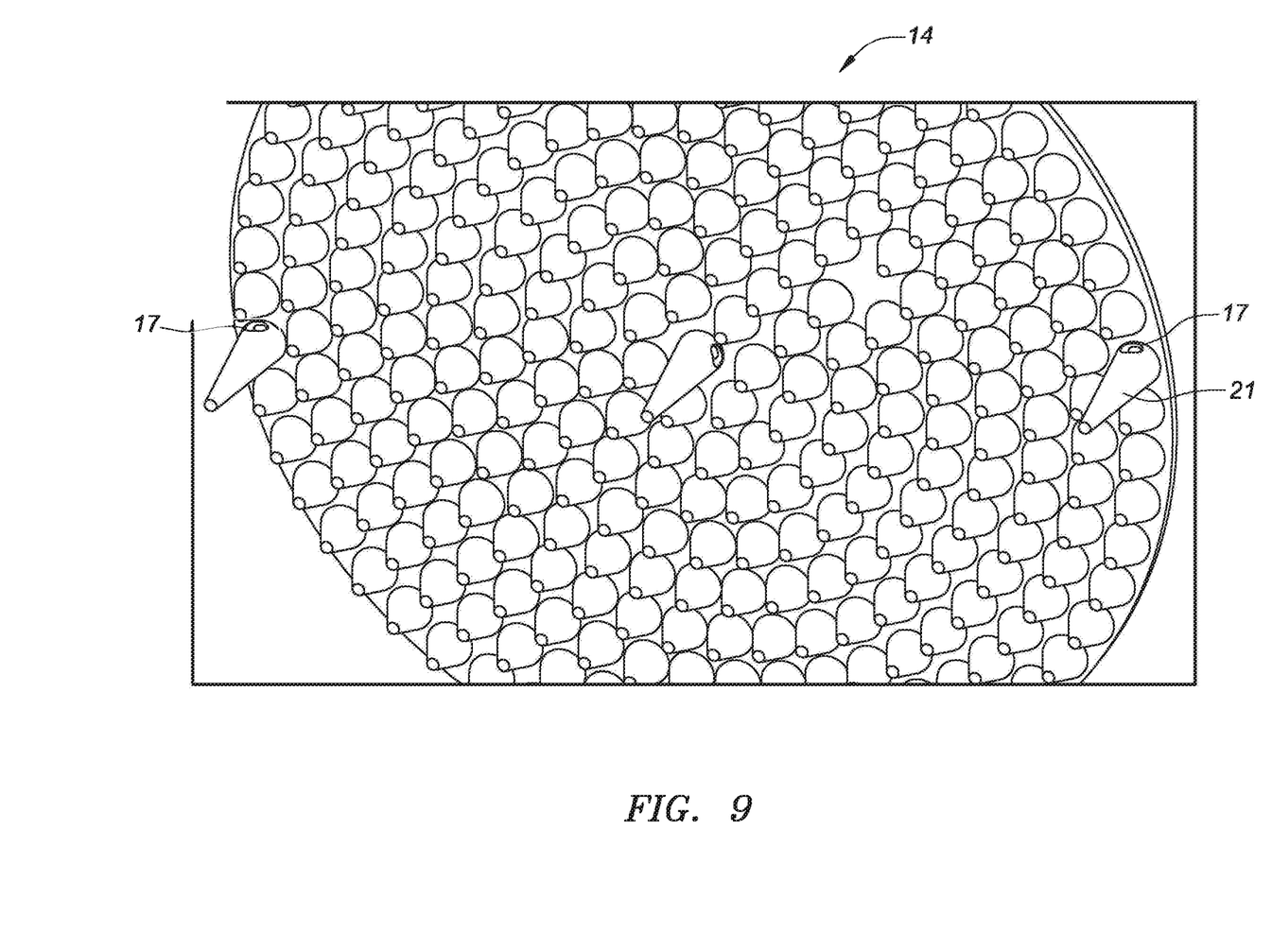
FIG. 9 illustrates an isometric view of the bottom of the filter of FIG. 3.

FIG. 9 illustrates an isometric view of the bottom of one embodiment of a filter 14. As may be seen in FIG. 9, the filter 14 may include a plurality of legs or stands 25. Legs 25 are extrusions from the bottom of the filter 14 that extend down past the bottom of the passages 20 such that the entire filter 14 is suspended off the bottom of the container 12 by the legs 25 when the filter 14 is placed in the container 12. Thus, when the filter 14 is placed in a container 12, the distance from the bottom of the legs 25 to the bottom of the passages 20 is a gap that is used to trap the dirt and particulates in the washing fluid.

In a preferred embodiment, the legs/stands 25 may simply be longer versions of passages 20. As may be seen in FIG. 9, the legs 25 have the same shape and design as the other passages 20 except the legs 25 have a longer, extended funnel section 22. In preferred embodiments, a set of legs 25 are positioned around the outer diameter. Additional legs 25 may also be used more towards the center of the filter. As may be seen in FIG. 9, a single leg 25 was added in the very center of the filter 14.

Figure 10:
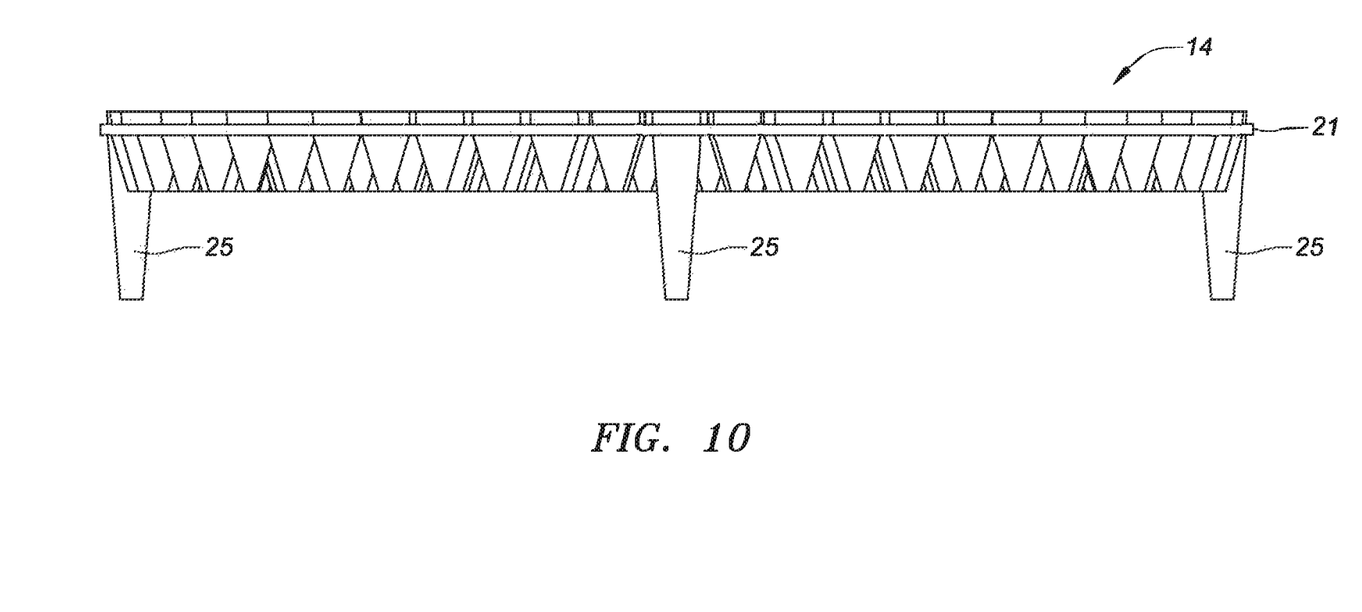
FIG. 10 illustrates a side view of the filter of FIG. 3.

FIG. 10 illustrates a side view of one embodiment of a filter 14. As may be seen in FIG. 10, the legs 25 extend down past the bottom of the passages 20 forming a gap under the filter 14 when the filter 14 is placed in the container 12. As may also be seen, the passages 20 extend above and below the body 21 of the filter 14.

Depending on the application, any number of passages 20 may be used on a filter 14. In some embodiments, a single filter 14 may contain tens, hundreds, or even thousands of passages 20. Passages 20 may be any size.

The passages 20 of the filter 14 are preferably sized to reduce the volume of grit, dust and dirt particles floating through the wash liquid. In some embodiments, the passages 20 have a large diameter of 2.5 centimeters and a small diameter of around 1 mm. However, the passages 20 may have a large diameter larger or smaller depending on the application. In some embodiments the passages have a large diameter of 20 cm. In still yet other embodiments, the large diameter may be 8 cm, 5 cm, or 3 cm. In still yet other embodiments, other sizes may be used. Similarly, the smaller diameter may include a range of sizes. In a preferred embodiment, the smaller diameter of the funnel 22 is smaller than 1 cm. Preferably, the small diameter is 8 mm, 6 mm, 4 mm, 3 mm, 2 mm or 1 mm. Preferably, the smaller diameter is sized to let large dirt particles to pass through from the top to the bottom while making it difficult for any particles to pass in the opposite direction.

Preferably the ratio of the larger diameter to the smaller diameter is at least 10 to 1. However, in other embodiments, other ratios may be used. In some embodiments, a ratio of 100 to 1 may be used. In yet other embodiments 50 to 1.30 to 1.5 to 1 or 3 to 1 may be used. In yet other embodiments, still other ratios may be used.

Generally, the smaller the passages 20 the higher the centrifugal forces exerted on the dust particles. To this end, a filter 14 with smaller and more abundant passages 20 is preferable. A filter 14 with a plurality of small funnel shaped passages 20 creates an efficient fluid straining and filtering system allowing separate smaller particles of dust and dirt to separate from wash fluids fast and efficiently.

Figure 11:
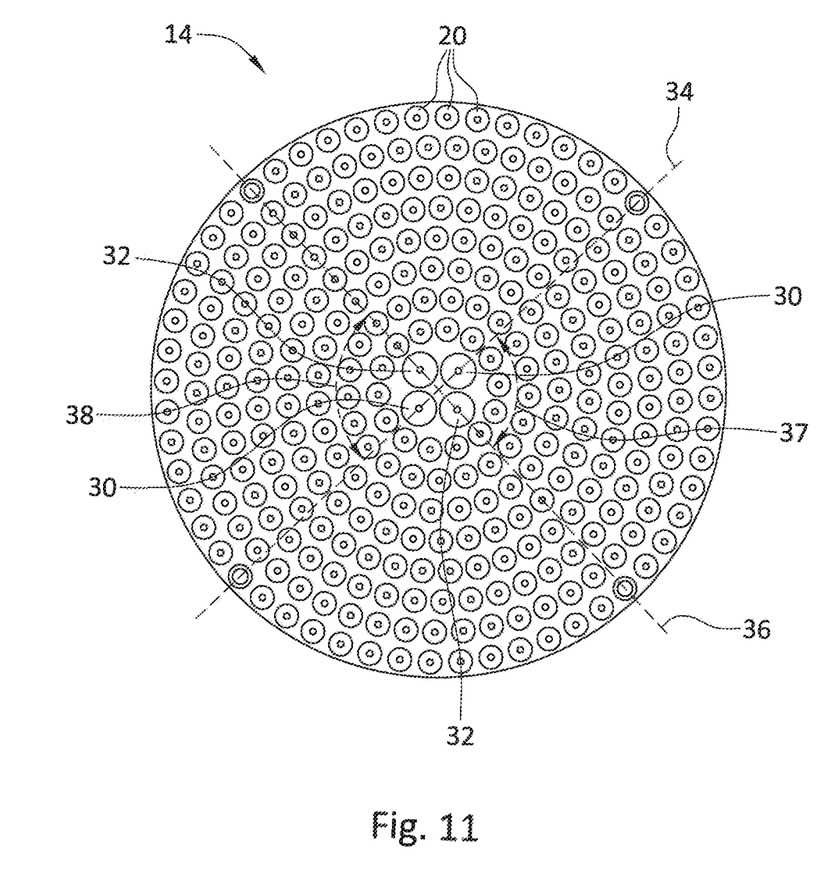
FIG. 11 illustrates a top view of another embodiment of a filter.

FIG. 11 illustrates a top view of another embodiment of a filter 14. The embodiment in FIG. 11 includes a configuration of passages 20 that allow for a unique stacking of filters 14. The filter 14 in FIG. 11, has a plurality of specially shaped and arranged passages 30 and 32. As may be seen in FIG. 11, passages 30 and 32 are larger in diameter than typical passage 20. In other embodiments, where passages 30 and 32 are not round, the passages 30 and 32 may just be wider than typical passages. As use herein, "typical passage" refers to the size and shape of the majority of the passages 20 on the filter 14.

Figure 12:
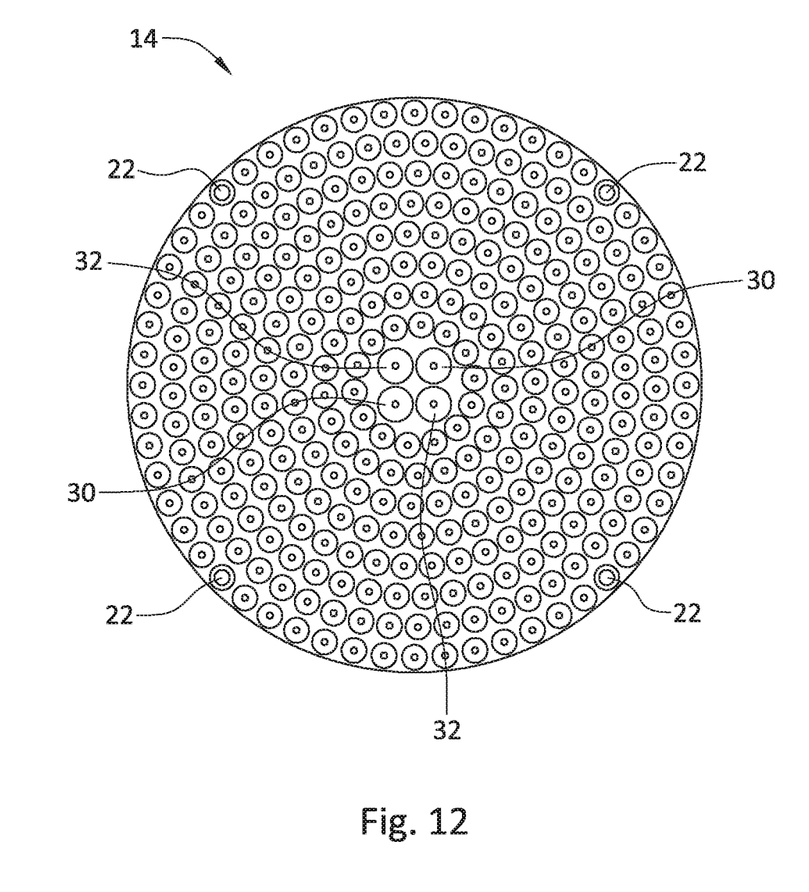
FIG. 12 illustrates a bottom view of the embodiment of a filter of FIG. 11.
Figure 13:
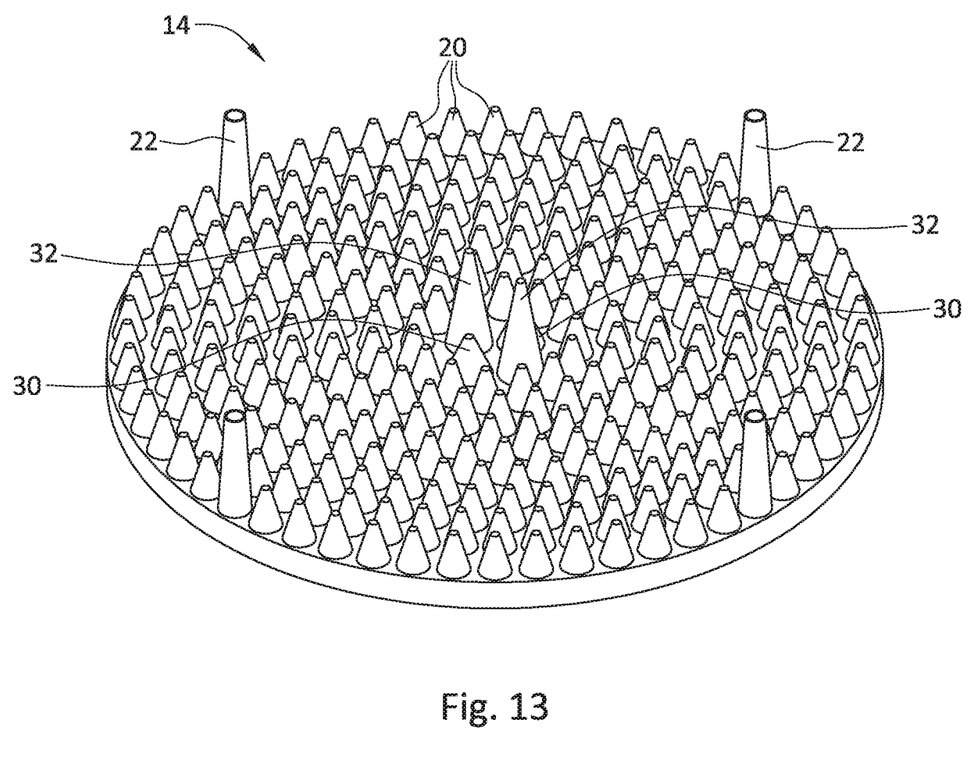
FIG. 13 illustrates an isometric view of the bottom of the filter embodiment of FIGS. 11 and 12.

FIG. 12 illustrates a bottom view of the embodiment of a filter 14 of FIG. 11 and FIG. 13 illustrates an isometric view of the bottom of the filter embodiment of FIGS. 11 and 12. As may be seen by comparing FIGS. 11,12 and 13, although the passages 30 and 32 have the same diameter, they have different shaped cones. In particular, the length of the cones is different. As may be seen in FIG. 12, the length of the cone for passages 32 are longer than those for cones 30. In preferred embodiments, the length of the passages 32 is at least twice as long as the length of a typical passage 20. In a more preferred embodiment, the passages 32 extend down below the bottom of the typical passage by at least the length of a typical passage. In an even more preferred embodiment, the passages 32 extend down below the bottom of the typical passage by 1.25 times the length of a typical passage. In at least one embodiment, a typical passage 20 extends half an inch below the bottom surface of the filter 14 while the passages 32 extend one and a quarter inches below the bottom surface of the filter 14. In such embodiments, the filter body may be around 5/16 inches thick.

Passages 30 form a first pair of alignment passages and passages 32 form a second pair of alignment passages. Both pair of passages are arranged radially around the central axis of the filter 14. To this end, all the alignment passages 30 and 32 are the same distance from the center or central axis of the filter 14. The alignment passages are spaced such that a first alignment passage from the first pair 30 is rotated a radial angle 37 from a first alignment passage of the second pair 32. Importantly, the second alignment passage of the first pair is positioned such that it is the identical radial angle 38 from the second passage of the second pair of alignment passages. In the embodiment shown in FIG. 11, the radial angle used is 90 degrees, but in other embodiments, other angles may be used.

When two filters are placed one on top of the other, they can be rotated one with respect to the other in any orientation. In preferred embodiments, different orientations of the two filters will produce different mating patterns. For example, in some embodiments, the individual filters only align all their passages 20 together in a single orientation. In other embodiments, all the passages may align in multiple orientations. As will be further explained below, the number of orientations in which the filters may be aligned creates some advantages and disadvantages.

Assuming the two filters are identical, they will have all their passages 20 align in at least one orientation. In such an orientation, the small diameter portion of the passages on the bottom side of the filter (shown in FIG. 12) will all line up and insert into the larger diameter portion of the passages on the top side of the filter (shown in FIG. 11). This will allow the two filters to be stacked together in a configuration that has a thickness that is less than the thickness of the two filters. This is because one filter has slid at least partially inside the other filter. In preferred embodiments, when two filters are stacked in the identical orientation, the bottom part of even the typical passages 20 of one filter are below the top surface of the second filter.

This is extremely advantageous for packaging because it allows a significantly greater number of filters to be shipped together and thus, reduces the shipping costs. Moreover, it strengthens the filters when they are shipped together to minimize the possibility of damage.

Although filters may fit together so that one filter mates inside the other filter for shipping etc, multiple filters may also stack together in other configurations that provide unique benefits. In the embodiment shown in FIGS. 11 and 12, if one filter is rotated around the central axis by the radial angel 37, 38, (in this case 90 degrees) with respect to a second filter, the first alignment passage 30 for the first pair of alignment passages 30 on the first filter will align with the first passage 32 from the second pair of alignment passages 32 on the second filter. In a similar manner, the second passage 30 from the first pair of alignment passages 30 on the first filter, will align with second passage 32 from the second pair of passages 32 on the second filter.

FIG. 13 illustrates an isometric view of the bottom of the filter embodiment of FIGS. 11 and 12. As may be seen in FIG. 13, passages 30 extend down from the bottom plane of the filter farther than the passages 32. Accordingly, the length of the passages 30 is greater than the length of the passages 32. In this embodiment, the passages 32 extend down from the bottom plane of the filter 14 the same distance as a typical passage 20. However, because the diameter of passages 30 is larger than the diameter of a typical passage 20, the shape of the cone for passages 30 is different. The passages 30 have a wider top diameter and the same size bottom diameter as the typical passage 20. Accordingly, passages 30 have a greater slope to their walls than a typical passage 20.

Because the passages 32 are longer than the passages 30, when a first filter is rotated by the radial angle 37, 38 with respect to a second filter and placed together, the longer passages 32 bottom out on the passages 30 first. To this end, rather than the two filters fitting one inside the other, the filters are held a preferred distance apart by the interference of the longer passages 32 in the passages 30. In a preferred embodiment, the filters are held apart such that the bottom of the typical passage 20 is held above the top surface of the second filter. Preferably, the bottoms of the typical passages 20 are held between 1 and 3 millimeters above the top surface of the second filter. This allows two filters to be stacked one on top of the other to create a double filter. The spacing of the two filters may be adjusted based on the maximum particle size to be filtered. The spacing should be large enough to allow the maximum particle size to pass between the filters and eventually filter to the bottom. More than two filters may be stacked together in such a configuration to allow as many filters as needed to be stacked. Each filter being turned by the radial angel 37, 38 one with respect to the other.

As may be appreciated, a filter has some kind of pattern of passages 20. In a preferred embodiment, this pattern on a first filter does not line up with a second filter when the two filters are rotated one with respect to the other by the radial angle 37, 38. This allows two filters stacked together to truly act like a double filter. If the typical passages were to align when the two filters were stacked, the two filters would just act like a thicker version of a single filter instead of truly providing a double filtering.

Figure 14:
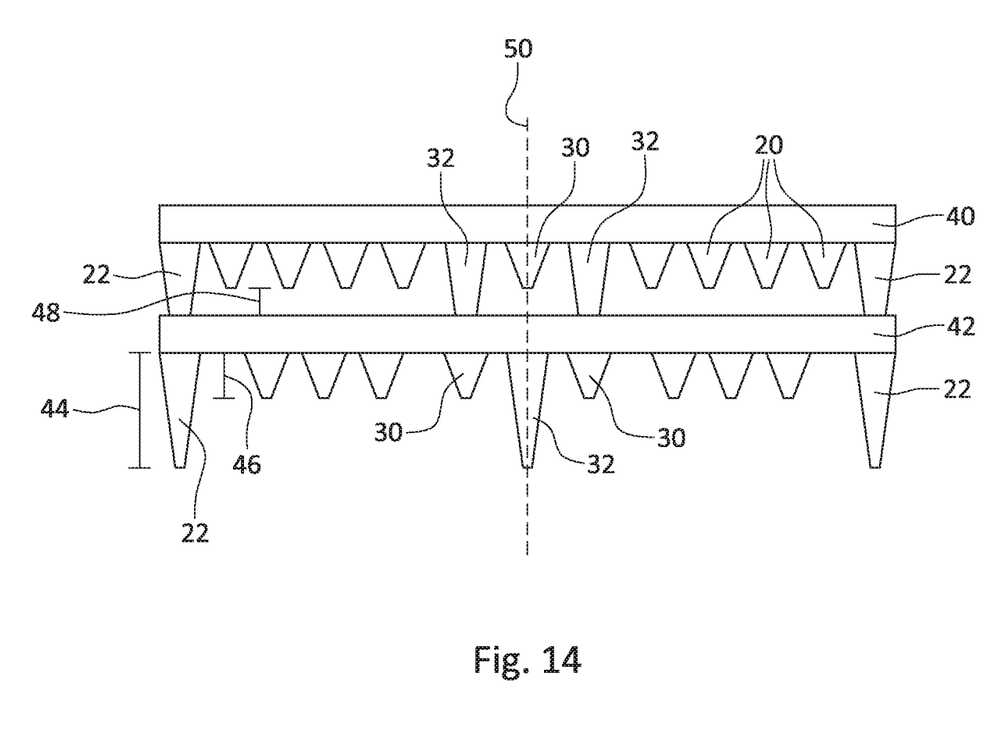
FIG. 14 illustrates two identical filters 40 and 42 assembled together one on top of the other but rotated about the central axis by the radial angle.

FIG. 14 illustrates two identical filters 40 and 42 assembled together one on top of the other. The two filters are axially aligned about their central axis 50 but the top filter 40 has been rotated around the central axis 50 by the radial angle with respect to the bottom filter 42. As may be seen, by rotating the top filter 40 by the radial angle with respect to the bottom filter 42, the first pair of alignment passages 32 aligns with the second pair of alignment passages 30. The alignment passages 32 are longer than the typical passages 20 and also longer than the second pair of alignment passages 30. To this end, the tapered alignment passages 32 on the top filter 40 that are longer than a typical passage 20 on the bottom filter 42 are inserted into the second pair of tapered alignment passages 30 on the bottom filter such that an outside bottom of the passages 32 on the top filter comes in contact with an inside bottom of the passages 30 on the bottom filter such that a typical passage 20 on the top filter 20 is held above the bottom filter and a typical passage 20 on the top filter 40 does not axially align with a typical passage 20 on the bottom filter 42.

As may be seen in FIG. 13, a number of longer passages 20 are located around the periphery of the filters 40 and 42. These legs are also spaced apart by the radial angle such that when the top filter 40 is rotated about the central axis 50 by the radial angle, the legs 22 also line up. The legs 22 and the alignment passages 32 extend down below the bottom surface of the filter by a length 44 whereas a typical passage 20, only extend down below the bottom surface of the filter by a length 46. In a preferred embodiment, the length 44 is at least twice the length 46. The difference in length can be used to adjust the height 48 the above the bottom filter 42 the top filter 40 rests when the two are stacked together in this rotated orientation. As may be appreciated, adjusting the length and relative length of the passages 32 and 30 can result in a different assembled separation height 48.

Although embodiments of filters and systems and methods for use have been described with reference to preferred configurations and specific examples, it will readily be appreciated by those skilled in the art that many modifications and adaptations are possible without departure from the spirit and scope of the embodiments as claimed hereinafter. Thus, it is to be clearly understood that this description is made only by way of example and not as a limitation on the scope of the embodiments as claimed below.

What is claimed is:

1. A filter comprising:
   a main body with a planar top surface and planer bottom surface;
   a plurality of tapered passages each with a bottom that comprise a plurality of passage bottoms wherein each passage passes through the body and wherein the plurality of passage bottoms extends below the planer bottom surface of the main body by a length;
   a first pair of tapered passages that are wider than the plurality of tapered passages wherein the first pair of tapered passages are positioned the same distance from the center of the filter and wherein the first pair of tapered passages are positioned a radial angle apart; and
   a second pair of tapered passages that are wider than the plurality of tapered passages wherein the second pair of tapered passages are positioned the same distance from the center of the filter as the first pair of tapered passages and wherein the second pair of tapered passages are positioned the radial angle apart and wherein the second pair of tapered passages extend below the bottom of the first pair of tapered passages by at least the length.

2. The filter of claim 1, wherein each passage in the plurality of tapered passages is funnel shaped.

3. The filter of claim 2, wherein the top of each passage in the plurality of tapered passages is a straight round section that transitions into the funnel shape.

4. The filter of claim 1, wherein the passages are arranged in concentric circles radiating out from a center of the filter.

5. The filter of claim 1, further comprising a plurality of legs that extend down from the body below a bottom of the passages.

6. The filter of claim 5, wherein each of the plurality of legs is also a funnel shaped passage.

7. The filter of claim 6, wherein the legs are all a same distance away from the center of the filter and spaced apart by the radial angle.

8. The filter of claim 1 wherein the radial angle is ninety degrees.

9. The filter of claim 1 wherein the first pair of tapered passages extends below the planar bottom surface of the main body by the length.

10. The filter of claim 1, wherein the second pair of passages extend below the bottom of the first pair of passages by 1.25 times the length.

11. A filter comprising:
    a plurality of passages all oriented parallel to each other wherein the passages are tapered and are wider at the top and taper to the bottom;
    a body that couples each of the plurality of passages together; wherein the passages are arranged in concentric circles radiating out from the center of the body and the passages protrude below a bottom surface of the body by a length;
    a first pair of tapered passages that are wider than the plurality of passages wherein the first pair of tapered passages are positioned the same distance from the center of the filter and wherein the first pair of tapered passages are positioned a radial angle apart; and
    a second pair of tapered passages that are wider than the plurality of passages wherein the second pair of tapered passages are positioned the same distance from the center of the filter as the first pair of tapered passages and wherein the second pair of tapered passages are positioned the radial angle apart and wherein the second pair of tapered passages extend below the bottom of the first pair of tapered passages by at least the length.

12. The filter of claim 11, wherein the top of each passage is a straight round section that transitions into the funnel shape.

13. The filter of claim 11, further comprising a plurality of legs that extend from the body down below a bottom of the passages.

14. The filter of claim 13, wherein each of the plurality of legs is also a funnel shaped passage.

15. The filter of claim 14, wherein each of the plurality of legs extends a bottom of the passages a same distance as the second pair of tapered passages.

\* \* \* \* \*